US012545854B2

(12) United States Patent
Mendes Pereira et al.

(10) Patent No.: US 12,545,854 B2
(45) Date of Patent: Feb. 10, 2026

(54) COMPOSITIONS FOR MULTI-PURPOSE CLEANING, PROCESS OF PREPARATION, USE OF SAID COMPOSITIONS AND MULTI-PURPOSE CLEANING PRODUCT

(71) Applicant: RHODIA BRASIL S.A., São Paulo (BR)

(72) Inventors: Lívia Mendes Pereira, Paulínia (BR); Sergio Teixeira, Campinas (BR); Sofia Madruga Marcondes Ferraz, Vinhedo (BR); Cinthia Sasamoto Nakamura, Campinas (BR); Daniela Hauffe, Campinas (BR); Rafael Francisco Ishikawa, Paulinia (BR); Sergio Martins, Campinas (BR); Adilson Marinheiro Da Silva, Paulínia (BR)

(73) Assignee: RHODIA BRASIL S.A., São Paulo (BR)

( * ) Notice: Subject to any disclaimer, the term of this patent is extended or adjusted under 35 U.S.C. 154(b) by 371 days.

(21) Appl. No.: 18/044,863

(22) PCT Filed: Jan. 18, 2021

(86) PCT No.: PCT/BR2021/050022

§ 371 (c)(1),
(2) Date: Mar. 10, 2023

(87) PCT Pub. No.: WO2022/051822

PCT Pub. Date: Mar. 17, 2022

(65) Prior Publication Data

US 2023/0399583 A1 Dec. 14, 2023

(30) Foreign Application Priority Data

Sep. 11, 2020 (BR) ........................ 102020018628-0

(51) Int. Cl.
*C11D 1/75* (2006.01)
*B08B 3/04* (2006.01)
(Continued)

(52) U.S. Cl.
CPC .............. *C11D 1/75* (2013.01); *C11D 3/2096* (2013.01); *C11D 3/43* (2013.01); *C11D 11/04* (2013.01)

(58) Field of Classification Search
CPC .. C11D 1/665; C11D 1/75; C11D 3/20; C11D 3/2024; C11D 3/43; C11D 11/04; B08B 3/04
See application file for complete search history.

(56) References Cited

U.S. PATENT DOCUMENTS 8,821,648 B2 9/2014 Lourenco
8,882,853 B2 11/2014 Son et al.
(Continued)

FOREIGN PATENT DOCUMENTS

EP 0401503 A2 12/1990
GB 2354771 A 4/2001
(Continued)

OTHER PUBLICATIONS

Search Report issued for corresponding international patent application No. PCT/BR2021/050022, mailed May 25, 2021 (2 pages).
(Continued)

*Primary Examiner* — Brian P Mruk
(74) *Attorney, Agent, or Firm* — Osha Bergman Watanabe & Burton LLP

(57) ABSTRACT

Composition for multi-purpose cleaning wherein said composition comprises a product of: (a) one or more amine oxide-based surfactant; and (b) one or more glycerol ketal derivative. Process for preparing said product, wherein the process comprises the product of one or more amine oxide
(Continued)

with one or more glycerol ketal derivative as solvent under stream of carbon dioxide and addition of peroxide oxide under semi-batch or batch reaction. Use of said composition, wherein the composition is used for preparing multi-purpose cleaning products, detergents, homecare or industrial cleaning products, washing products, as base preparations for homecare cleaning products and as base preparations for industrial cleaning products.

15 Claims, 1 Drawing Sheet

(51) Int. Cl.

| | |
|---|---|
| ***C11D 3/20*** | (2006.01) |
| ***C11D 3/43*** | (2006.01) |
| ***C11D 11/04*** | (2006.01) |

(56) References Cited

U.S. PATENT DOCUMENTS

2014/0031271 A1* 1/2014 Lourenco ............. C11D 3/2075 510/238
2018/0064838 A1 3/2018 Blondeau et al.
2019/0062673 A1 2/2019 Klemmer et al.

FOREIGN PATENT DOCUMENTS

| | | | | | |
|---|---|---|---|---|---|
| JP | 8003590 | A2 | 1/1996 | | |
| SG | 11202009247 | | 10/2020 | | |
| WO | 93/03006 | A1 | 2/1993 | | |
| WO | 2017064551 | A1 | 4/2017 | | |
| WO | WO 2017/064551 | * | 4/2017 | ............... | C11D 3/20 |
| WO | 2019126815 | A2 | 6/2019 | | |
| WO | 2019188140 | A1 | 10/2019 | | |
| WO | WO 2019/188140 | * | 10/2019 | ............... | C11D 3/20 |
| WO | WO-2021079172 | A1 * | 4/2021 | ............... | C11D 1/22 |

OTHER PUBLICATIONS

Written Opinion issued for corresponding international patent application No. PCT/BR2021/050022, mailed May 25, 2021 (6 pages).

* cited by examiner

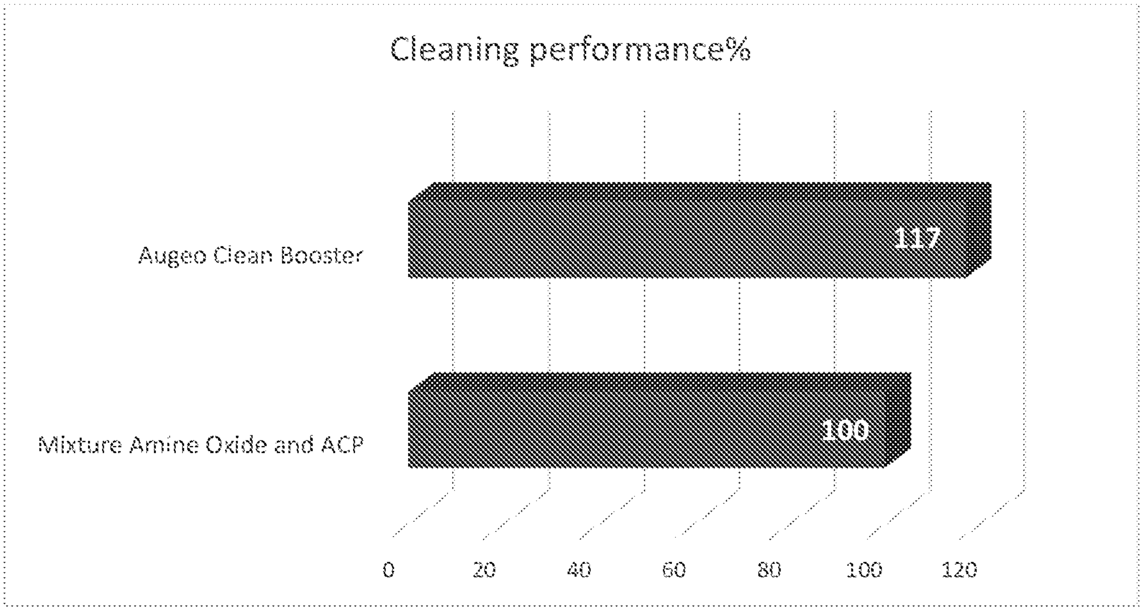
Cleaning performance%
Augeo Clean Booster
117
Mixture Amine Oxide and ACP
100
0
20
40
60
80
100
120

COMPOSITIONS FOR MULTI-PURPOSE CLEANING, PROCESS OF PREPARATION, USE OF SAID COMPOSITIONS AND MULTI-PURPOSE CLEANING PRODUCT

This application is a national stage entry of PCT/BR2021/050022, filed on Jan. 18, 2021, which claims priority filed on 11 Sep. 2020 in BRAZIL with Nr 102020018628.0, the whole content of this application being incorporated herein by reference for all purposes.

TECHNICAL FIELD

The present invention refers to a composition for cleaning purposes and base preparations for preparing multi-purpose cleaning products for promoting the cleaning of toilets and kitchens, in home care segment or industrial segment. The composition refers to a multi-purpose cleaner composition or a base preparation for preparing multi-purpose cleaning products comprising a product of at least one amine oxide-based compound and at least one active solvent.

BACKGROUND OF THE INVENTION

The present invention relates to multi-purpose cleaning compositions and base preparations, in particular multi-purpose amine-based compositions for cleaning surfaces to be used in home care segment or industrial segment.

The multi-purpose cleaning compositions are developed to clean several different types of washable surfaces in toilets and kitchens, for example, hard surfaces, floors, walls, windows and household items or industrial items, among others.

The state of the art describes a large variety of cleaning compositions to be applied in home care or industrial segment.

WO19188140 refers to a liquid detergent composition for cleaning dishes or cooking utensils, which contains a mixture of different types of surfactants, for example: component (A), a component (B) and a component (C), and which is configured such that: the component (A) is an anionic surfactant; the component (B) is a specific compound; the component (C) is at least one surfactant selected from the group consisting of amphoteric surfactants and amine oxide surfactants; and the mass ratio expressed by (component (A))/(component (B)) is 0.06-45.

It is also known from the prior art that a cleaning agent can be achieved by a mixture of surfactants with inorganic salts and other components, as taught in US 2019062673 which is directed to a structured liquid washing agent or cleaning agent with a flow limit, containing a surfactant system of anionic surfactants, nonionic surfactants and co-surfactants, inorganic salt and an amphiphilic compound.

Multi-purpose cleaning compositions is also described in U.S. Pat. No. 8,821,648, which refers to compositions for cleaning surfaces comprising one or more solvents that are at least partially water-miscible, one or more alkali metal salts of carboxylic acids, one surfactant, one basifying agent and water.

It is verified that there are some disadvantages in use suspend solids in liquids in a stable form. Moreover, even though the state of the art developed several cleaning compositions containing a variety types of mixture of surfactants, the compositions from the state of the art were not able to achieve an effective cleaning performance that could require little efforts from users. Therefore, despite there is a variety of cleaning compositions in the state of the art, there is still a need to achieve a cleaning composition that provides desirable stability and efficiency, with high concentrations of surfactants that guarantees effortless for cleaning and, at the same time, provides safety to its user.

OBJECTIVES OF THE INVENTION

The present invention is designed to solve the problems related to the lack of efficacy of the current cleaning compositions in home care or industrial segments, providing a safe product for users.

It is a first objective of the invention to provide a composition containing a product of one or more amine oxide and one or more active solvent which increases the efficacy of cleaning compositions or cleaning products for the surface care field.

Another objective of the present invention is to provide a composition for base preparation, such composition containing a product of one or more amine oxide and one or more active solvent. The base preparation is used for preparing a product for cleaning, being necessary to adjust the pH, add the fragrance and preservatives.

It is also an objective of the present invention to describe a process for preparing a multi-purpose cleaning composition, such cleaning composition can be used as base preparation for preparing cleaning products.

A further objective of the invention is the use of the composition for being used as base preparation for preparing a product for multi-purpose cleaning in home care or industrial segments for cleaning surfaces such those encountered in kitchens, bathrooms, industry or for cleaning textiles.

Finally, it is another object of the invention a multi-purpose cleaning product comprising the composition consisting of a product of one or more amine oxide-based surfactant and one or more active solvent.

BRIEF DESCRIPTION OF THE INVENTION

The cleaning compositions available in the state of the art do not fully meet the needs of their users in home care or industrial cleaning and they often need to perform a hard cleaning to remove soils or dirt accumulation from surfaces. Thus, there is still a need to achieve a cleaning composition that provides desirable stability and efficiency that guarantees effortless for cleaning and that could be applied for any type of domestic or industrial dirt and that at the same time, provides safety to its user.

Due to this technical problem, it was developed a multi-purpose cleaning composition with a high concentration of active ingredients in which provides a greater cleaning efficiency and is totally safe for the users.

The present invention refers to a composition containing a product of one or more amine oxide-based surfactant and one or more active solvent which is an glycerol ketal derivative. A process for preparing a composition, the use of the composition and a multi-purpose cleaning product containing said composition are also disclosed herein.

BRIEF DESCRIPTION OF THE FIGURES

FIG. 1—Comparative assessment of the cleaning performance (%) of the composition of the invention in relation to a composition containing a mixture of an amine oxide and Augeo Clean Plus, added separately.

DETAILED DESCRIPTION OF THE INVENTION

Different cleaning composition designs are already known in the state of the art, but none of them achieves desirable cleaning properties with high efficiency and safety.

It has now surprisingly been found that the aforementioned disadvantage can be reduced or eliminated by the multi-purpose cleaning composition of the invention.

In a first aspect, the subject-matter of the invention is directed to a composition containing a product of one or more amine oxide-based surfactant and one or more active solvent.

The state of the art provided a variety of surfactants and active solvents that could be used in detergent or cleaner compositions. However, the specific product of at least one amine oxide-based surfactant with at least one active solvent had demonstrated a superior effect in terms of increasing the final concentration of the ingredients, consequently, positively affecting in the cleaning yield in relation to the conventional products on the market.

Particularly, the technical effect of the invention is achieved by a composition containing a product of at least one amine oxide-based surfactant and at least one glycerol ketal derivative which increases the cleaning performance for the surface care segment, in home care or industrial fields.

More specifically, it was unexpected that the concentration of one or more amine oxide-based surfactants, after mixing with one or more solvents derived from ketal glycerol, would result in higher concentrations of the amine oxide itself when compared to the current solvent of the common composition due to a synergistic interaction between these two components.

The present invention refers to a cleaner composition which basically contains two components: (a) at least one amine oxide-based surfactant and (b) at least one glycerol ketal derivative solvent.

The first component is the amine oxide-based ingredient, selected from alkyldimethyl-N-oxides, in which the alkyl comprises from 8 to 18 carbons.

Preferred examples of amine oxide-based surfactants from the invention can be selected from the following list:

octyldimethylamine oxide;
decyl(dimethyl)amine oxide;
dodecyldimethylamine oxide;
tetradecyldimethylamine oxide
hexadecyldimethylamine N-oxide;
or mixtures thereof
octyldimethylamine oxide The second component of the present multi-purpose cleaning composition of the invention refers to an active solvent. The solvents has an important role in the composition, since they can act in combination with the surfactants for reducing the surface tension of water and solubilizing the water-soluble and the water-insoluble soiling materials. Moreover, the active solvent acts in the composition as micelle promoters, reducing the repulsion of the hydrophilic heads of the surfactants, maintaining the solvent actives ratio.

The active solvent used in the present invention comprises at least one glycerol ketal derivative (b), which offers a favorable product which the amine-oxide based component (a) regarding solubility, stability, volatility, toxicity, low odor, environmental profile and low cost.

The glycerol ketal derivative based compounds are prepared from glycerin, a by-product of biodiesel production. Some of glycerol ketal derivatives of the invention refer to compounds commercially available, for example under the name of Augeo Clean Plus®, Augeo Clean Multi® or Augeo ACT. Preferred examples of glycerol ketal derivatives solvents are selected from:

2-isobutyl-2-methyl-1,3 dioxolane-4-methanol (Augeo Clean Plus®);
2,2-dimethyl-1,3-dioxylane-4-methanol or solketal (Augeo Clean Multi®);
2,2-dimethyl-1,3-dioxolane-4-acetate (Augeo ACT);
2,2-diisobutyl-1,3-dioxolane-4-methanol (Augeo SL 191®);
2-isopropyl-1,3-dioxolane-4-methanol;
2-butyl-2-ethyl-1,3-dioxolane-4-methanol;
2-phenyl-1,3-dioxolane-4-methanol;
2-methyl-2-phenyl-1,3-dioxolane-4-methanol;
(2-(heptan-3-yl)-1,3-dioxolan-4-yl)methanol; or mixtures thereof.

In other words, the effect of the present composition resides in the fact that the production of the reaction of the amine oxide occurs in the solvent medium which allows to increase the concentration of the amine oxide composition of the final product in relation to the same production using the current solvent (Water).

Particularly, it was observed that the concentration of the amine oxide in the composition increased from 30 to 40% by weight of efficiency.

Moreover, the present invention provides a second advantageous aspect in the final product, in which the final product (composition) is completely dilutable until 5% in water solution without any impact on the process safety, promoting a very slighting heating in the final solution due to low exothermic properties. This become this product a very efficient way to sell a concentrated solution for the cleaners segment.

In one embodiment of the invention, the present composition contains the following ingredients: 31 to 45% by weight of at least one amine oxide-based surfactant and 35 to 50% by weight of at least one glycerol ketal derivative solvent.

Specifically, the composition refers to a product of 35 to 41% by weight of at least one amine oxide-based surfactant and 40 to 49% by weight of at least one glycerol ketal derivative solvent.

In one specific example, the cleaner composition refers to a product of 39 to 41% by weight of one at least one amine oxide and 45 to 47% by weight of at least one glycerol ketal derivative.

The composition can comprise the addition of one amine oxide-based surfactant or more than one amine oxide-based surfactant, i.e., a mixture of two or three amine oxide-based surfactants. It is also possible to include in the composition one or more than one glycerol ketal derivative solvent, for example, a mixture of two or three glycerol ketal derivatives.

In another embodiment, the composition contains the following ingredients: a product of 35 to 41% by weight of at least one amine oxide and 40 to 49% by weight of at least one glycerol ketal derivative solvent and 10 to 25% by weight of excipients.

The excipients are, for example: water, suspending agents, fragrances, pH buffers, alkalizing agents, preservatives, among others.

In another specific embodiment, the cleaner composition of the invention comprises a product of (i) an amine oxide tetradecyldimethylamine and (ii) an active solvent 2-isobutyl-2-methyl-1,3 dioxolane-4-methanol (commercially known as Augeo Clean PLUS®).

It was verified that a product of (i) a tetradecyl dimethyl amine oxide and (ii) Augeo Clean PLUS® showed a synergistic effect between the surfactant and the active solvent increasing the concentration of amine oxide in the composition.

This unexpected and synergistic effect of a product containing the tetradecyl dimethyl amine oxide and the Augeo Clean Plus® provided an efficient cleaning performance without the need for additional ingredients or additives.

The active solvent Augeo Clean Plus® is a sustainable solvent with degreasing performance commercialized by Rhodia and it is used for household, industrial and degreasing compositions where performance is required to remove heavy soils. Such solvent is non-toxic for humans or to environment, it is a colorless and clear liquid, non-corrosive, low volatility and slight odor, and it is identified with CAS number 5660-53-7 and International Classification Methyl isobutyl glycerol Formal.

The active solvent of Augeo Clean Plus is the compound 2-isobutyl-2-methyl-1,3 dioxolane-4-methanol, with molecular formula $C_9H_{18}O_3$, comprising the following structural formula I:

(I)

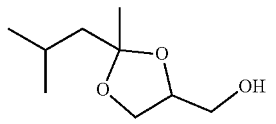

The above compound can be synthetized by reaction between glycerol and isobutyraldehyde, under well-known classical process conditions.

Although Augeo Clean Plus® is already known for its efficiency as an active solvent, it was unexpectedly discovered in the present invention that a product of the active solvent of Augeo Clean Plus, namely the compound 2-isobutyl-2-methyl-1,3 dioxolane-4-methanol with the amine oxide tetradecyl dimethyl amine oxide, could provide even higher concentrations of amine oxide in the final composition compared to the solvent used today on the market (water), resulting in a composition or a cleaning product with synergistic properties.

In one embodiment, the composition comprises a product of 35 to 41% by weight of tetradecyl dimethyl amine oxide and 40 to 49% by weight of Augeo Clean Plus® containing the active ingredient 2-isobutyl-2-methyl-1,3 dioxolane-4-methanol.

In another embodiment the composition refers to a product of 35 to 41% by weight of tetradecyl dimethyl amine oxide, 40 to 49% by weight of Augeo Clean Plus® containing the active ingredient 2-isobutyl-2-methyl-1,3 dioxolane-4-methanol and 10 to 25% by weight of excipients, preferably the excipient being water.

All % by weight cited herein is based on the total weight of the composition.

In one specific example, the detergent composition refers to a product of 39 to 41% by weight of tetradecyl dimethyl amine oxide, 45 to 47% by weight of Augeo Clean Plus® containing the active ingredient 2-isobutyl-2-methyl-1,3 dioxolane-4-methanol and 12 to 16% by weight of excipients, preferably the excipient being water.

In some aspects of the invention, the product refers to at least one amine oxide and at least one glycerol ketal derivative resulted in alkyldimethyl amine residual in the final composition, in which it can be expected the presence of up to 1.0% of such alkyldimethyl amine. Preferably, there may be up to 0.7% of such alkyldimethyl amine, which was resulted of unreacted raw material in the process.

The preferred grade of the raw material presents the carbon chain distribution as described in table 1 below:

TABLE 1

| Carbon chain distribution of the raw material | | |
|---|---|---|
| Carbon chain distribution, Wt % | C12 and lower | 3.0 max |
| | C14 | 95.0 min. |
| | C16 and higher | 2.0 max |

The same distribution of carbon chain is also expected for the final composition. The above minor compounds are converted in amine oxides and are reported as active content.

In another specific embodiment of the present invention, the composition of the invention may contain about 0.1% of sodium bicarbonate ($NaHCO_3$) derived from the process, since such ingredient may substitute carbon dioxide as catalyst, however the sodium bicarbonate exhibits lower performance and introduces residual amounts of sodium salts.

Usually a cleaner product contains in the composition water, one or more surfactants, one or more solvents, alkalizing agents, co-solvents, fragrances and some preservatives. In terms of percentage weight, the main products are solvents and surfactants. Thus, the composition of the present invention is a very efficient way to sell a composition or to sell a base preparation containing said composition for preparing a final product for cleaning purposes, just being necessary to adjust the pH, add the fragrance and preservatives.

Among the excipients that can be present in the composition or in the final product, we can quote, for example: water, alkyldimethyl amine, sodium salts, surfactants, solvents, co-solvents, alkalizing agents, pH buffers, co-solvents, fragrances, preservatives, chelating agents, anti-corrosion agents, thickeners or anti-foam agents or mixtures thereof.

The surfactant is generally selected in the group consisting of anionic, cationic, non-ionic, hydrotope and amphoteric surfactants. The alkalizing agent is generally selected in the group consisting of amines or hydroxides, notably sodium hydroxide or potassium hydroxide. The co-solvent is generally selected in the group consisting of alcohols, notably ethanol, isopropanol or butanol.

Further additives can be added to the composition like chelating agents, anti-corrosion agents, thickeners, anti-foam agents and others.

The composition of the present invention can be used for cleaning purposes, for example for removing a substance such as a coating, oily soils and/or stains, or inks, sealants, adhesives, wax, grease, oils from a substrate comprises contacting the substance with a composition comprising at least one amine-oxide based compound and at least one glycerol ketal derivative. The cleaning composition of the invention can be used to remove a wide variety of substances for homecare or industrial segments, generally those soluble or softenable by organic solvents.

The composition of the invention is used for preparing multi-purpose cleaning products, detergents, homecare or industrial cleaning products, washing products, as base preparations for homecare cleaning products and as base preparations for industrial cleaning products.

Examples of cleaning purposes include materials such as window/glass cleaners, multi-purpose cleaners, bathroom cleaners, home care wipes, kitchen cleaners, metal cleaners, heavy duty, floor cleaners or oven cleaners, industrial oily soils, industrial degreaser, machinery and duty cleaner, industrial kitchen cleaner; laundry, dish washing among others.

The process of preparation of a cleaner composition refers to a product of at least one amine oxide-based surfactant with at least one glycerol ketal derivative. They are weighted and placed in a reactor under semi-batch or batch reaction classical process. The product is stirred and a carbon dioxide stream is inserted in the reaction medium followed by the slowly addition of hydrogen peroxide under specific temperature and time control.

Other details or advantages of the invention will emerge more clearly in the light of the experimental section given below, purely for indicative purposes.

Experimental Section No 1

1.1—Preparation of the Cleaning Composition of the Invention: Augeo Clean Booster (ACB):

The cleaning composition of the invention was prepared, comprising of the following ingredients: tetradecyldimethylamine and 2-isobutyl-2-methyl-1,3-dioxolan-4-yl)methanol (Augeo Clean Plus®).

Firstly, 284.5 grams (1.63 mol) of 2-isobutyl-2-methyl-1,3-dioxolan-4-yl)methanol (Augeo Clean Plus) and 229 grams of dimethyltetradecylamine (0.95 mol) were weight and placed in a reactor.

Then, stirring was turned on and a stream of carbon dioxide started to be bubbled in the reaction medium.

After that, 96.7 grams of 35% hydrogen peroxide (1.00 mol) was added slowly, over a period of 1 h. The temperature was controlled below 60° C. during the dosage of hydrogen peroxide. Then, carbon dioxide ($CO_2$) bubbling was stopped (0.61 g added in total), the temperature was raised to 65° C. and the reaction was kept for 6 hours.

The final product was analysed and it was verified that the final concentration of dimethyltetradecylamine oxide was 40% and 0.1% alkyldimethyl amine.

1.2—Cleaning Performance Evaluation:

The tests to evaluate the cleaning performance of the present invention and the materials for carrying out the test are described below.

Cleaning performance was assessed using a method described in ASTM D4488-95 "Standard guide for cleaning performance testing of products intended for use on resilient floors and washable walls".

The cleaning performance (%) of the claimed invention was evaluated by comparison with an equivalent composition, that is, with a composition containing the same concentration of Augeo Clean Plus and Amine Oxide, however, were added separately.

The preparation of an equivalent composition containing Augeo Clean Plus and Amine Oxide added separately has been termed "a mixture of Amine Oxide and ACP (Augeo Clean Plus)". This "mixture of amine oxide and ACP" composition, which will be considered as a standard composition, was prepared by adding the following order of ingredients: 1st water, $2^{nd}$ alkalizing monoethanolamine, 3rd amine oxide MO 30 (30% by weight of oxide of myristylamine) and 4th Augeo Clean Plus. The components were added separately.

The present invention was named in the present experimental test as "Augeo Clean Booster". The composition of the present invention was prepared by adding the following order of ingredients: 1st water, 2nd alkalizing monoethanolamine, 3rd Augeo Clean Booster (ACB). The ACB was prepared in a reactor under a semi-batch reaction following the classic process (see Experimental Section No 1-Item 1.1).

Below are the comparatively normalized performances, where the performance of the standard composition is considered 100% and the comparative composition is evaluated against the standard.

After that, it was measured the cleaning performance, which was assessed for the two compositions and the results were placed in table 2 below:

TABLE 2

Composition and % of cleaning performance.

| Ingredients | Composition: mixture Amine Oxide and ACP- Standard composition (added separately) W/W% | Composition: Augeo Clean Booster of the present invention W/W% |
|---|---|---|
| Amine oxide MO 30 | 2.70 | — |
| Augeo Clean Plus (ACP) | 0.90 | — |
| Alkalizing | 0.40 | 0.40 |
| Augeo Clean Booster (ACB) | — | 2.00 |
| Water | 96.00 | 97.60 |
| Total: | 100.00 | 100.00 |
| Obs: | Mixture Amine Oxide and ACP | Augeo Clean Booster |
| Cleaning performance % | 100 | 117 |

The present experimental data from table 2 show that in terms of cleaning performance the "Augeo clean booster" of the invention provided cleaning performance 17% higher than the composition called "mixture of amine oxide and ACP".

This unexpected and superior/synergistic effect of the greater cleaning performance of the "Augeo Clean Booster" composition is due to the size of the micelles formed in this solution that are smaller and more dispersed than those present in the composition containing the added ingredients separately.

Experimental Section No 2

Another comparative test in relation cleaning efficiency was performed in view of the commercially available product. The present composition presents a much better performance than the market-benchmarking product.

For instance a cleaning efficiency obtained with a cleaner composition containing 1.0% of Augeo Clean Booster of the present invention is obtained with the same efficiency with a cleaner composition containing 1.5% of the main competitor's product.

TABLE 3

Comparative test of the cleaning performance of Augeo Clean Booster of the present invention in view of the commercially available product.

| Cleaning Performance* | Concentration w/w % Augeo Clean Booster | Concentration w/w % benchmarking |
|---|---|---|
| 5.00 | 0.40 | 0.50 |
| 10.00 | 0.80 | 1.00 |
| 15.00 | 1.00 | 1.50 |
| 20.00 | 1.10 | 2.00 |
| 25.00 | 1.20 | 2.50 |
| 30.00 | 1.40 | 3.00 |
| 35.00 | 1.50 | 3.50 |
| 40.00 | 1.60 | 4.00 |
| 45.00 | 1.70 | 4.50 |
| 50.00 | 1.80 | 5.00 |

*Normalized Values

Preferred examples and embodiments having been described, it should be understood that the scope of the present invention embraces other possible variations, being limited only by the contents of the accompanying claims, which include the possible equivalents.

Specific language is used in the description to facilitate the understanding of the principle of the invention. It should, however, be understood that no limitation of the scope of the invention is envisaged by the use of this specific language. Modifications, improvements and perfections may especially be envisaged by a person skilled in the technical field concerned, on the basis of his own general knowledge.

The invention claimed is:

1. A composition for multi-purpose cleaning wherein said composition comprises a product of:

(a) one or more amine oxide-based surfactant; and (b) one or more glycerol ketal derivative, wherein the composition comprises a product of 31 to 45% by weight of one or more amine oxide-based surfactant (a), and 35 to 50% by weight of one or more glycerol ketal derivative (b).

2. The composition according to claim 1 wherein the amine oxide based surfactant (a) is selected from: decyl (dimethyl)amine oxide, dodecyldimethylamine oxide, tetradecyldimethylamine oxide, hexadecyldimethylamine N-oxide, or mixtures thereof.

3. The composition according to claim 1 wherein the glycerol ketal derivative (b) is selected from a list consisting of:

2-isobutyl-2-methyl-1,3 dioxolane-4-methanol,
2,2-dimethyl-1,3-dioxolane-4-methanol,
2,2-dimethyl-1,3-dioxolane-4-acetate,
2,2-diisobutyl-1,3-dioxolane-4-methanol,
2-isopropyl-1,3-dioxolane-4-methanol,
2-butyl-2-ethyl-1,3-dioxolane-4-methanol,
2-phenyl-1,3-dioxolane-4-methanol,
2-methyl-2-phenyl-1,3-dioxolane-4-methanol,
(2-(heptan-3-yl)-1,3-dioxolan-4-yl) methanol, or mixtures thereof.

4. The composition according to claim 1 wherein it comprises or three amine oxide-based surfactants (a); and (ii) one, two or three glycerol ketal derivatives (b).

5. The composition according to claim 1, wherein it comprises a product of 35 to 41% by weight of one or more amine oxide (a), and 40 to 49% by weight of one or more glycerol ketal derivative (b).

6. The composition according to claim 5, wherein it comprises a product of 35 to 41% by weight of one or more amine oxide (a), 40 to 49% by weight of at least one glycerol ketal derivative (b), and 10 to 25% by weight of excipients.

7. The composition according to claim 1 wherein it comprises a product of (i) an amine oxide tetradecyldimethylamine oxide, and (ii) an active solvent 2-isobutyl-2-methyl-1,3 dioxolane-4-methanol.

8. The composition according to claim 7 wherein it comprises a product of 35 to 41% by weight of tetradecyl dimethyl amine oxide, and from 40 to 49% by weight of 2-isobutyl-2-methyl-1,3 dioxolane-4-methanol.

9. The composition according to claim 8 wherein it comprises a product of 35 to 41% by weight of tetradecyl dimethyl amine oxide, from 40 to 49% by weight of 2-isobutyl-2-methyl-1,3 dioxolane-4-methanol, and 10 to 25% by weight of excipients.

10. The composition according to claim 9 wherein it comprises a product of 39 to 41% by weight of tetradecyl dimethyl amine oxide, from 45 to 47% by weight of 2-isobutyl-2-methyl-1,3 dioxolane-4-methanol and 12 to 16% by weight of excipients.

11. The composition according to claim 1 wherein the composition further comprises one or more of the following excipients: water, alkyldimethyl amine, sodium salts, surfactants, solvents, co-solvents, alkalizing agents, pH buffers, co-solvents, fragrances, preservatives, chelating agents, anti-corrosion agents, thickeners, anti-foam agents or mixtures thereof.

12. A process for preparing a product as defined in claim 1, wherein the process comprises combining the product of one or more amine oxide with one or more glycerol ketal derivative as solvent under stream of carbon dioxide and addition of peroxide under semi-batch or batch reaction.

13. A method, comprising: cleaning with a composition as defined in claim 1 wherein the composition is used to remove oily soils and/or stains, inks, sealants, adhesives, wax, grease, oils from a substrate for home care and industrial cleaning purposes.

14. A multi-purpose cleaning product wherein it comprises a composition as defined in claim 1 and excipients.

15. The multi-purpose cleaning product, according to claim 14 wherein the excipients are selected from: water, alkyldimethyl amine, sodium salts, surfactants, solvents, co-solvents, alkalizing agents, pH buffers, co-solvents, fragrances, preservatives, chelating agents, anti-corrosion agents, thickeners, anti-foam agents or mixtures thereof.

* * * * *